United States Patent [19]
Pilgram et al.

[11] 3,847,588
[45] Nov. 12, 1974

[54] THIAZOLES HERBICIDAL
[75] Inventors: Kurt H. Pilgram; Richard D. Skiles, both of Modesto, Calif.
[73] Assignee: Shell Oil Company, New York, N.Y.
[22] Filed: Nov. 7, 1972
[21] Appl. No.: 304,423

Related U.S. Application Data
[62] Division of Ser. No. 30,367, April 20, 1970, Pat. No. 3,717,651.

[52] U.S. Cl. .................................................. 71/90
[51] Int. Cl............................................. A01n 9/12
[58] Field of Search.......................................... 71/90

[56] References Cited
UNITED STATES PATENTS

| | | | |
|---|---|---|---|
| 3,155,678 | 11/1964 | Hatchand | 71/90 X |
| 3,427,318 | 2/1969 | Barber et al. | 71/90 X |
| 3,682,945 | 8/1972 | Engelhart | 71/90 X |

Primary Examiner—James O. Thomas, Jr.

[57] ABSTRACT

Certain novel amides of at least three carbon atoms, which are substituted on the nitrogen by a thiazol-2-yl moiety, useful as herbicides.

6 Claims, No Drawings

THIAZOLES HERBICIDAL

This is a division, of application Ser. No. 030,367, filed Apr. 20, 1970 now U.S. Pat. No. 3,717,651.

BACKGROUND OF THE INVENTION

1. Field of the Invention

This invention relates to a novel class of herbicidal amides containing at least three carbon atoms, and which are substituted on the nitrogen by a thiazol-2-yl moiety substituted at the 5-position by a sulfur-containing moiety.

2. Description of Prior Art

N-(thiazol-2-yl)acetamides are known. Japanese Patent 16,498/63 discloses 2-acetamido-5-alkylthiothiazoles which are useful as fungicides. Other substituted 2-acetamido derivatives of 5-alkylthio or alkylsulfonyl thiazoles have found utility as bactericides (J. Pharm. Soc. Japan 72, 1123-8[1952]), and as intermediates in dye production (J. Org. Chem. 24, 187-96[1959] and British Pat. No. 851,564).

SUMMARY OF THE INVENTION

It has now been found that amides of greater carbon content than acetamide, substituted on the nitrogen by a thiazole-2-yl moiety substituted at the 5-position of the ring by a mercapto, sulfinyl, sulfonyl or sulfamoyl moiety, and optionally substituted in the 4-position with an alkyl group, are outstanding herbicides, giving effective control of several economically important weed species.

The invention accordingly is a new class of amides of greater carbon content than acetamide, substituted on the nitrogen by a thiazol-2-yl moiety substituted at the 5-position of the ring by a mercapto, sulfinyl, sulfonyl or sulfamoyl moiety and optionally substituted in the 4-position with an alkyl group, their use as herbicides and herbicidal formulations containing them.

DESCRIPTION OF THE PREFERRED EMBODIMENT

The novel compounds of this invention can be described by the general formula:

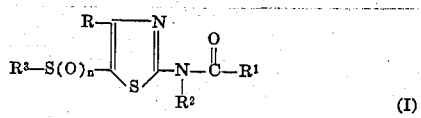

(I)

wherein R represents hydrogen or alkyl or up to four carbon atoms; $R^1$ is alkyl of two to eight carbon atoms, cyclic alkyl of up to eight carbon atoms, alkenyl of up to eight carbon atoms, or aryl, all of which may be unsubstituted or substituted by one or more of fluorine, chlorine, bromine, cyano or trifluoromethyl; $R^2$ is hydrogen or alkyl of up to four carbon atoms; $n$ is 0, 1 or 2; $R^3$ is hydrogen, alkyl of up to four carbon atoms, cyclic alkyl of up to four carbon atoms or

wherein $R^4$ represents hydrogen, alkyl of up to four carbon atoms or cyclic alkyl of up to four carbon atoms; $R^5$ is any of the moieties represented by $R^4$ or a lower alkali metal ion (Na, K or Li) or $R^6$—C(O)— wherein $R^6$ is alkyl of up to three carbon atoms; $R^5$ also represents alkoxy of up to three carbon atoms or

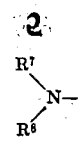

wherein $R^7$ and $R^8$ are hydrogen or alkyl of up to three carbon atoms when $R^4$ is hydrogen or alkyl of up to three carbon atoms; $R^4$ and $R^5$ together also may form an alkylene group. Any of these alkyl groups may be of either branched-chain or straight-chain configuration.

Exemplary species of the class of the invention include:

N—(4-methyl-5-(dimethylsulfamoyl)thiazol-2-yl)cyclopropanecarboxamide,
N—(5-(dimethylsulfamoyl)thiazol-2-yl)cyclopropanecarboxamide,
N—(4-methyl-5-(dimethylsulfamoyl)thiazol-2-yl)propionamide,
N—(5-(dimethylsulfamoyl)thiazol-2-yl)propionamide,
N—(5-(dimethylhydrazinosulfonyl)thiazol-2-yl)cyclopropanecarboxamide,
N—(5-(methylsulfamoyl)thiazol-2-yl)cyclopropanecarboxamide,
N—(5-(methylsulfamoyl)thiazol-2-yl)propionamide, Sodium salt of N-(5-(methylsulfamoyl)thiazol-2-yl)cyclopropanecarboxamide,
Sodium salt of N—(5-(methylsulfamoyl)thiazol-2-yl)propionamide,
Potassium salt of N—(5methylsulfamoyl 2-yl)cyclopropanecarboxamide,
Potassium salt of N—(5-(methylsulfamoyl)thiazol-2-yl)propionamide,
N—(5-(aziridinylsulfonyl)thiazol-2-yl)cyclopropanecarboxamide,
N—(5-(methylthio)thiazol-2-yl)-2-methylacrylamide,
N—(5-(methylsulfinyl)thiazol-2-yl)-2-methylacrylamide,
N—(5-(methylsulfonyl)thiazol-2-yl)-2-methylacrylamide,
N—(5-(methylthio)thiazol-2-yl)-3,3-bis(trifluoromethyl)acrylamide,
N—(5-methylthio)thiazol-2-yl)-2-cyanocyclopropanecarboxamide,
N—(5-(methylthio)thiazol-2-yl)cyclopentanecarboxamide,
N—(5-(methylsulfonyl)thiazol-2-yl)cyclopentanecarboxamide,
N—(5-(methylthio)thiazol-2-yl)-3,4-dichlorobenzamide,
N—(5-(methylsulfonyl)thiazol-2-yl)-3,4-dichlorobenzamide,
N—(5-(methylsulfonyl)thiazol-2-yl)octanamide,
N—(5-(methylsulfonyl)thiazol-2-yl)-2,2-dimethylpentamide,
N—(5-(methylthio)thiazol-2-yl)-3-methyl-5,5-dimethylhexanamide The highest herbicidal activity appears to be associated with the subclass wherein R represents hydrogen or alkyl, $R^1$ is alkyl or cyclic alkyl, $R^2$ is hydrogen or methyl, $R^3$ is alkyl, cyclic alklyl or

wherein $R^4$ and $R^5$ represent hydrogen or alkyl of up to three carbon atoms, $n$ is 0, 1 or 2. Preferred species of this subclass include compounds wherein R and $R^2$ represent hydrogen or methyl, $R^1$ is alkyl of two to five carbon atoms or cyclic alkyl of up to four carbon atoms, $R^3$ is alkyl of up to three carbon atoms.

Specific examples of the preferred subclass include:

N—(5-(methylthio)thiazol-2-yl)propionamide;
N—(5-(methylsulfonyl)thiazol-2-yl)propionamide,
N—(4-methyl-5-(methylthio)thiazol-2-yl)propionamide,
N—(4-methyl-5-(methylsulfonyl)thiazol-2-yl)propionamide,
N—(5-(ethylthio)thiazol-2-yl)propionamide,
N—(5-(ethylsulfonyl)thiazol-2-yl)propionamide,
N—(5-(isopropylsulfonyl)thiazol-2-yl)proionamide,
N—(5-(isopropylthio)thiazol-2-yl)propionamide,
N—(5-(isopropylsulfonyl)thiazol-2-yl)propionamide,
N—(5-(methylthio)thiazol-2-yl)-2-methylpropionamide,
N—(5-(methylsulfonyl)thiazol-2-yl)-2-methylpropionamide,
N—(5-(methylthio)thiazol-2-yl)cyclopropanecarboxamide,
N—(5-(methylsulfonyl)thiazol-2-yl)cyclopropanecarboxamide,
N—(5-(methylsulfinyl)thiazol-2-yl)cyclopropanecarboxamide,
N—(4-methyl-5-(methylthio)thiazol-2-yl)cyclopropanecarboxamide,
N—(4-methyl-5-(methylsulfonyl)thiazol-2-yl)cyclopropanecarboxamide,
N—(5-(methylthio)thiazol-2-yl)-1-methylcyclopropanecarboxamide,
N—(5-(methylsulfonyl)thiazol-2-yl)-1-methylcyclopropanecarboxamide,
N—(5-(ethylthio)thiazol-2-yl)cyclopropanecarboxamide,
N—(5-(ethylsulfonyl)thiazol-2-yl)cyclopropanecarboxamide,
N—(5-(isopropylthio)thiazol-2-yl)cyclopropanecarboxamide,
N—(5-(isopropylsulfonyl)thiazol-2-yl)cyclopropanecarboxamide,
N—(5-(methylthio)thiazol-2-yl)-2,2-dimethylpropionamide,
N—(5-(methylsulfonyl)thiazol-2-yl)-2,2-dimethylpropionamide,
N—(5-(methylthio)thiazol-2-yl)cyclobutanecarboxamide,
N—(5-(methylthio)thiazol-2-yl)-2-methylpentanamide,
N—(5-(ethylthio)thiazol-2-yl)-2-methylpentanamide,
N—(5-(isopropylthio)thiazol-2-yl)-2-methylpentanamide,
N—(5-(methylsulfonyl)thiazol-2-yl)-2-methylpentanamide,
N—(5-(ethylsulfonyl)thiazol-2-yl)-2-methylpentanamide,
N—(5-(isopropylsulfonyl)thiazol-2-yl)-2-methylpentanamide,
N-methyl-N-(4-methyl-5-(methylsulfonyl)thiazol-2-yl)cyclopropanecarboxamide,
N-methyl—N—(4-methyl-5-(methylthio)thiazol-2-yl)cyclopropanecarboxamide,
N-methyl—N—(4-methyl-5-(methylthio)thiazol-2-yl)propionamide,
N-methyl—N—(4-methyl-5-(methylsulfonyl)thiazol-2-yl)propionamide,
N—(4-methyl-5-(ethylthio)thiazol-2-yl)cyclopropanecarboxamide,
N—(4-methyl-5-(ethylsulfonyl)thiazol-2-yl)cyclopropanecarboxamide, The compounds of this invention are solid at ambient temperature. They may be suitably formulated for use as herbicides, as wettable powders, dusts, granules, solutions, emulsifiable concentrates, emulsions and pastes. Wettable powders are usually compounded to contain 25, 50, 75, or up to 85 percent of toxicant and usually contain, in addition to solid carrier, 3–10 percent of a dispersing agent and, where necessary, 0–10 percent of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½ to 10 percent of toxicant. Granules are usually prepared to have a size between 10 and 100 BS mesh, and may be manufactured by agglomeration or impregnation techniques. Generally, granules will contain ½–25 percent of toxicant plus additives such as stabilizers, slow-release modifiers, binding agents, etc. Emulsifiable concentrates usually contain, in addition to the solvent, and, when necessary, co-solvent, 10–50 percent s/v toxicant, 2–20 percent w/v emulsifiers and 0–20 percent of appropriate additives such as stabilizers, penetrants and corrosion inhibitors. Pastes are compounded so as to obtain a stable flowable product and usually contain 10–60 percent toxicant, 2–20 percent of appropriate additives and, as carrier, water or an organic liquid in which toxicant is substantially insoluble. Except where indicated otherwise, all percentages given in this paragraph are percentages by weight.

The herbicidal compounds of this invention may be prepared by the reaction of the substituted 2-aminothiazole of formula II:

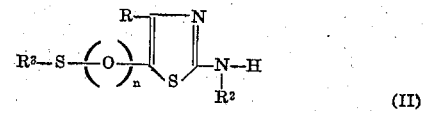

(II)

wherein R, $R^2$ and $R^3$ are as defined above, with an acyl halide of the formula $R^1$—CO—Hal in which $R^1$ is as defined above and Hal represents a halogen atom, preferably chlorine. The reaction is suitably carried out in the presence of a base such as a tertiary amine or pyridine. The base serves as an acid scavenger for the hydrogen halide which is formed. The reaction is run in an anhydrous solvent such as tetrahydrofuran or ether at a reaction temperature ranging from 25° to 90°C with a reaction time of from 15 minutes to 3 hours.

The substituted aminothiazoles of formula II can be prepared using, as an initial reaction step, the general synthesis technique for thiazoles which was first described by Hantzsch (Ann. 249, 1 [1888]). This technique which involves the reaction of alpha-halocarbonyl compounds with thioureas or thioamides affords a convenient means of obtaining the desired unsubstituted or 4-alkyl substituted 2-aminothiazole intermediate.

The 2-aminothiazole intermediate is then treated with an appropriate halogenating agent to yield a 5-halo-2-aminothiazole. This reaction can be successfully carried out in solvents such as water aqueous acids, chloroform, carbon tetrachloride, benzene, carbon disulfide and glacial acetic acid using agents such as iodine, bromine, chlorine or sulfuryl chloride.

The reaction of the halogenated 2-aminothiazole intermediate with a sodium mercaptide will yield the desired 5-thio-2-aminothiazole by replacement of the halogen. This reaction is suitably carried out in refluxing methanol. If an alkylthio compound is desired, the appropriate sodium alkylmercaptide should be used.

This thio compound can be oxidized to the sulfinyl derivative by treatment with meta-chloroperbenzoic acid in chloroform solution. The sulfonyl derivative is prepared similarly using an excess of 33 percent hydrogen peroxide in glacial acetic acid or acetone solution.

5-sulfamoyl derivatives may be prepared by reacting an acylated 2-aminothiazole, optionally substituted in the 4-position with alkyl groups, with excess chlorosulfonic acid and phosphorus pentachloride to yield the 5-chlorosulfonyl intermediate. This 5-chlorosulfonyl intermediate is then reacted with the appropriate primary or secondary amine or ammonia to yield the desired 5-sulfamoyl derivative.

The compounds of the invention, processes for their preparation and their herbicidal activity, are illustrated by the following examples, in which parts by weight (w) and parts by volume (v) bear the same relation as the kilogram to the liter and all temperatures are in degrees centigrade.

EXAMPLE I

N—(5-(ethylthio)thiazol-2-yl)propionamide

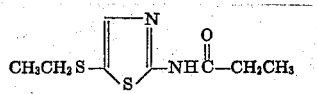

2-aminothiazole (150 w) prepared using the technique described in the prior art was charged into a flask containing 48 percent hydrobromic acid (250 w). This solution was heated to reflux (125°) and bromine (240 w) was added dropwise. The addition was exothermic making external heat unnecessary. After completion of the addition the reaction mixture was cooled to 25°, diluted with 200 v of acetone and cooled to 5°. The resulting precipitate was filtered, washed well with acetone and air dried. This solid (202 w) was suspended in water (800 v) and cooled to 5°. Sodium hydroxide (52 w) in water (50 v) containing sodium hydrosulfite (1.0 w) was added dropwise. The mixture was stirred at 5° for 1 hour and filtered to yield 2-amino-5-bromothiazole (188 w) melting at 104°–105°.

A mixture of 2-amino-5-bromothiazole (45 w), ether (200 v) and ethyl mercaptan (15.5 w) was treated with a solution of sodium methoxide (13.5 w) in absolute methanol (50 v) over a period of 15 minutes. The exothermic reaction raised the temperature to 40° and a fine solid precipitated. The reaction mixture was stirred at ambient temperature for 1 hour and washed with water (3 × 100 v). The organic fraction was dried with MgSO₄ and concentrated by distillation in a vacuum to yield a red solid. This residue was extracted with boiling hexane and the solution was chilled to yield 2-amino-5-(ethylthio)thiazole (25 w) melting at 73°–75°. The structure was confirmed by infrared spectrum analysis.

To a mixture of 2-amino-5-(ethylthio)thiazole (6 w), tetrahydrofuran (50 v) and triethylamine (3.8 w), propionyl chloride (3.5 w) was added dropwise. The addition produced a precipitate and was exothermic to 45°. The reaction mixture was stirred at ambient temperature for 30 minutes and poured into ice water. The solid was collected on a filter and dried to yield N—(5-(ethylthio)thiazol-2-yl)propionamide (7.3 w) m.p. 153°–155°. The structure was confirmed by elemental and infrared analyses.

| Analysis (Percent by Weight) | | |
| --- | --- | --- |
| Calculated: | N-13.0 | S-29.6 |
| Found: | N-13.2 | S-29.5 |

EXAMPLE II

N—(5-(ethylsulfonyl)thiazol-2-yl)propionamide

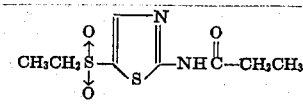

To a solution of N—(5-(ethylthio)thiazol-2-yl)propionamide (4 w) in glacial acetic acid (30 v), 30 percent hydrogen peroxide (15 v) was added. The reaction mixture, which was exothermic to 80°, was cooled with external cooling to 50°. The reaction mixture was then left standing at ambient temperatures for 6 hours at which time it was poured into ice water and filtered to yield N—(5-(ethylsulfonyl)thiazol-2-yl)propionamide (3.5 w) m.p. 210°–213°. The structure was confirmed by elemental and infrared spectrum analyses.

| Analysis (Percent by Weight) | | |
| --- | --- | --- |
| Calculated: | N-11.3 | S-25.8 |
| Found: | N-11.2 | S-25.9 |

EXAMPLE III

N—(4-methyl-5-(methylthio)thiazol-2-yl)propionamide

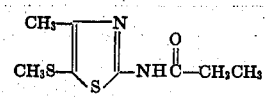

2-amino-4-methylthiazole (78 w) prepared using the technique described by Hantzsch (Ann. 249, 1 [1888]) was dissolved in concentrated hydrochloric acid (120 v) and bromine (38 v) was added dropwise to the solution over a period of 30 minutes. The temperature of the reaction was controlled at or below 60° during the addition with an ice bath. A colorless solid precipitated during the addition. The reaction mixture was chilled to 4°, diluted with 125 v of acetone and filtered. The filter cake was dissolved in a minimum amount of cold water and treated with aqueous ammonia until pH of 8 was obtained. The solid was filtered and dried to yield 2-amino-5-bromo-4-methylthiazole (55 w) melting at 104°–106°. The structure was confirmed by infrared spectrum analysis.

A solution of 2-amino-5-bromo-4-methylthiazole (45 w) in absolute methanol (150 v) was stirred during the addition of a solution of sodium methoxide (12.6 w) and methyl mercaptan (11.2 w) in absolute methanol (100 v). After completion of the addition (15 minutes), the reaction mixture was heated to reflux (64°) for 2.5 hours, left at ambient temperature for 18 hours, poured over ice, and extracted with methylene chloride (3 × 150 v). The combined extracts were dried with magnesium sulfate and concentrated by distillation in a vacuum to a red solid. The residue was recrystallized from hexane-benzene (3:2) to yield 2-amino-4-methyl-5-(methylthio)thiazole (23 w) melting at 77°–80°. The structure was confirmed by elemental analysis.

To a mixture of 2-amino-4-methyl-5-(methylthio)thiazole (12.7 w), tetrahydrofuran (100 v) and triethylamine (8.2 w), propionyl chloride (7.5 w) was added dropwise. The addition which was exothermic to 55° caused a solid to precipitate. The reaction product was cooled to ambient temperature, poured into ice water and filtered. The solid filter cake was recrystallized from methanol and then from ethanol to yield N—(4-methyl-5-(methylthio)thiazol-2-yl)propionamide (3 w) m.p. 126°–127°. The structure was confirmed by elemental and infrared analyses.

| Analysis (Percent by Weight) | | |
|---|---|---|
| Calculated: | N-13.0 | S-29.6 |
| Found: | N-12.8 | S-29.2 |

EXAMPLE IV

N—(4-methyl-5-(methylsulfonyl)thiazol-2-yl)propionamide

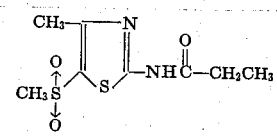

To a solution of N—(4-methyl-5-(methylthio)thiazol-2-yl)propionamide (2 w) in chloroform (50 v), 85% m-chloroperbenzoic acid was added. The solution was chilled during the addition and upon completion of the addition, the reaction mixture was allowed to stand at ambient temperatures for 18 hours. The reaction mixture was then washed with an aqueous solution of sodium carbonate (3 w in 15 v), after which the chloroform solution was dried and concentrated by distillation in a vacuum to 2 w of solid residue. The residue was recrystallized from methanol to yield N—(4-methyl-5-(methylsulfonyl)thiazol-2-yl)propionamide (1.3 w) m.p. 162–164. The structure was confirmed by elemental and infrared spectrum analyses.

| Analysis (Percent by Weight) | | |
|---|---|---|
| Calculated: | N-11.3 | S-25.8 |
| Found: | N-11.2 | S-26.1 |

EXAMPLE V

N—(5-(dimethylsulfamoyl)-thiazol-2-yl)propionamide

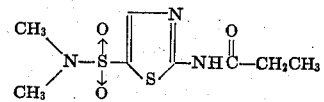

A solution of N—(5-chlorosulfonyl)thiazol-2-yl)propionamide (8 w, prepared from N—(thiazol-2-yl)propionamide in excess chlorosulfonic acid and phosphorus pentachloride) in acetone (25 v) was saturated with dimethylamine. This mixture was allowed to stand for 30 minutes. The solvent was removed under vacuo and the residue was washed with dilute HCl. The resultant solid was collected on a filter and recrystallized from methanol to yield N—(5-(dimethylsulfamoyl)-thiazol-2-yl)propionamide (3 w) m.p. 227–230. The structure was confirmed by elemental and infrared spectrum analyses.

| Analysis (Percent by Weight) | | |
|---|---|---|
| Calculated: | N-16.0 | S-24.3 |
| Found: | N-16.0 | S-24.6 |

EXAMPLE VI

Following procedures similar to those given in previous examples, the following other species of the compounds of the invention were prepared (symbols refer to formula III).

TABLE I

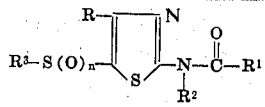

| | | | | | M.P. | Sulfur | | Nitrogen | |
|---|---|---|---|---|---|---|---|---|---|
| R₃ | R | R₁ | R₂ | n | (°C) | Calcd. | Found | Calcd. | Fonud |
| CH₃ | H | C₂H₅ | H | 0 | 152–155 | 31.7 | 32.0 | 13.9 | 13.5 |
| CH₃ | H | C₂H₅ | H | 2 | 219–221 | 22.4 | 26.9 | 12.0 | 11.9 |
| CH(CH₃)₂ | H | C₂H₅ | H | 0 | 177–179 | 27.8 | 27.6 | 12.5 | 12.5 |
| CH(CH₃)₂ | H | C₂H₅ | H | 2 | 234–237 | 24.4 | 24.2 | 10.7 | 10.5 |

TABLE I—Continued

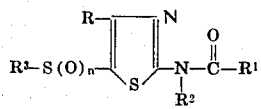

| R3 | R | R1 | R2 | n | M.P. (°C) | Sulfur Calcd. | Sulfur Found | Nitrogen Calcd. | Nitrogen Found |
|---|---|---|---|---|---|---|---|---|---|
| CH3 | H | ◁-CH3 | H | 0 | 95-98 | 28.0 | 27.8 | 12.3 | 12.1 |
| C2H5 | H | ◁ | H | 0 | 140-142 | 28.1 | 28.0 | 12.3 | 12.1 |
| C2H5 | H | Same as above | H | 2 | 210-213 | 24.6 | 24.9 | 10.8 | 11.0 |
| CH(CH3)2 | H | do | H | 0 | 158-161 | 26.4 | 26.3 | 11.6 | 11.8 |
| CH(CH3)2 | H | do | H | 2 | 220-223 | 23.4 | 23.1 | 10.2 | 10.8 |
| CH3 | H | ◁-Ph | H | 0 | 203-206 | 22.1 | 22.2 | 9.6 | 9.5 |
| CH3 | H | Same as above | H | 2 | 228-231 | 19.9 | 19.9 | 8.7 | 8.8 |
| CH3 | H | C(CH3)3 | H | 0 | 85-88 | 27.8 | 27.9 | 12.2 | 12.5 |
| CH3 | H | C(CH3)3 | H | 2 | 157-160 | 24.4 | 24.6 | 10.7 | 10.8 |
| CH3 | H | ◇ | H | 0 | 175-177 | 28.0 | 28.4 | 12.3 | 12.2 |
| CH3 | H | Same as above | H | 2 | 230-232 | 23.6 | 23.6 | 10.8 | 10.7 |
| CH3 | H | −CH(CH3)C3H7 | H | 0 | 87-89 | 26.2 | 26.0 | 11.5 | 11.4 |
| C2H5 | H | Same as above | H | 0 | 100-103 | 24.8 | 24.7 | 10.9 | 10.9 |
| CH(CH3)2 | H | do | H | 0 | 114-116 | 23.5 | 23.4 | 10.3 | 10.2 |
| CH3 | H | do | H | 2 | 163-165 | 23.2 | 23.1 | 10.1 | 10.1 |
| C2H5 | H | do | H | 2 | 159-162 | 22.1 | 22.3 | 9.7 | 9.5 |
| CH(CH3)2 | H | do | H | 2 | 145-148 | 21.1 | 20.8 | 9.2 | 8.9 |
| CH3 | H | ⌂ | H | 0 | 197-200 | 26.4 | 26.5 | 11.6 | 11.6 |
| CH3 | H | Same as above | H | 2 | 262-264 | 23.4 | 23.2 | 10.2 | 10.2 |
| CH3 | H | −CH2C(=CH2)CH3 | H | 0 | 100-102 | 26.2 | 26.7 | 11.5 | 11.6 |
| CH3 | H | CH=C(CF3)2 | H | 0 | 172-174 | 19.0 | 19.0 | 8.3 | 8.1 |
| CH3 | H | CH(CH3)2 | H | 0 | 173-175 | 29.6 | 29.8 | 13.0 | 12.6 |
| CH3 | H | CH(CH3)2 | H | 2 | 252-254 | 25.8 | 25.8 | 11.3 | 11.0 |
| CH3 | H | −CH(CH3)(=CH2) | H | 0 | 109-112, 112-115 | 29.9 | 29.5, 30.1 | 13.1 | 12.8, 13.1 |
| CH3 | H | Same as above | H | 1 | 145-146 | 27.8 | 28.1 | 12.2 | 12.5 |
| CH3 | H | do | H | 2 | 222-224 | 26.0 | 26.4 | 11.4 | 11.6 |
| CH3 | H | ◁ | H | 0 | 183-184 | 29.9 | 30.0 | 13.1 | 13.0 |
| CH3 | CH3 | Same as above | H | 0 | 189-192 | 28.0 | 28.3 | 12.3 | 12.1 |
| CH3 | H | do | H | 1 | 188-189 | 27.8 | 27.9 | 12.2 | 12.0 |
| CH3 | H | do | H | 2 | 265-266 | 26.0 | 26.0 | 11.4 | 11.1 |
| CH3 | CH3 | do | H | 2 | 220-223 | 24.6 | 24.2 | 10.8 | 10.6 |
| CH3 | H | ◁-CN | H | 0 | --- | 26.8 | 25.9 | 17.6 | 15.5 |
| CH3NH | CH3 | C2H5 | H | 2 | 155-158 | 24.4 | 24.2 | 16.0 | 15.5 |
| NH2 | H | C2H5 | H | 2 | 238-241 | 27.2 | 26.5 | 17.9 | 17.2 |
| (CH3)2N | CH3 | C2H5 | H | 2 | 174-177 | 23.1 | 22.8 | 15.2 | 15.4 |
| (CH3)2N | H | C2H5 | H | 2 | 227-230 | 24.3 | 24.6 | 16.0 | 16.0 |
| CH3 | CH3 | C2H5 | CH3 | 0 | 70-73 | 27.8 | 27.6 | 12.2 | 12.5 |
| CH3 | CH3 | C2H5 | CH3 | 2 | 159-162 | 24.4 | 24.7 | 10.7 | 10.8 |

EXAMPLE VII

Pre-emergence herbicidal activity of the typical compounds of the invention was evaluated by planting weed seeds in soil held in large test tubes, the soil having been treated with the test compound at the rate of 1 and 10 milligrams of test compound per tube, respectively. Seeds of watergrass (*Echinochloa crusgalli*) and cress (*Lepidium sativum*) were germinated in treated soil under controlled conditions of temperature and light for 12 to 13 days prior to evaluation of the effectiveness of the treatments. At that time, the germination was noted and the treatments were rated on a 0 (no effect) to 9 (all dead) scale. The results are summarized in Table II.

Post-emergence herbicidal activity was evaluated by spraying dilute suspensions of the test compound in a 1:1 mixture of acetone and water with 0.5 percent wetting agent on crabgrass (*Digitaria sanguinalis*) and pigweed plants (*Amaranthus sp*) grown under controlled conditions at the rates of 1 and 10 pounds test compound per acre. After the plants were held for 10 to 11 days, they were rated for treatment effect on a 0 (no effect) to 9 (total plant kill) scale. The results of these tests are shown in Table II.

TABLE II

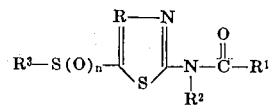

| R¹ | R² | R³ | R⁴ | n | Pre-emergence Watergrass 1 | 10 | Cress 1 | 10 | Post-emergence Crabgrass 1 | 10 | Pigweed 1 | 10 |
|---|---|---|---|---|---|---|---|---|---|---|---|---|
| CH₃ | H | C₂H₅ | H | 0 | 8 | 9 | 8 | 9 | 7 | 9 | 9 | 9 |
| CH₃ | H | C₂H₅ | H | 2 | 7 | 8 | 9 | 9 | 1 | 9 | 7 | 9 |
| CH₃ | CH₃ | C₂H₅ | H | 0 | 6 | 8 | 9 | 9 | 9 | 9 | 7 | 9 |
| CH₃ | CH₃ | C₂H₅ | H | 2 | 8 | 8 | 9 | 9 | 6 | 9 | 7 | 9 |
| C₂H₅ | H | C₂H₅ | H | 0 | 8 | 8 | 8 | 8 | 9 | 9 | 9 | 9 |
| C₂H₅ | H | C₂H₅ | H | 2 | 8 | 8 | 9 | 9 | 9 | 9 | 9 | 9 |
| (CH₃)₂CH | H | C₂H₅ | H | 0 | 1 | 7 | 8 | 8 | 8 | 9 | 8 | 9 |
| (CH₃)₂CH | H | C₂H₅ | H | 2 | 8 | 8 | 9 | 9 | 6 | 8 | 9 | 9 |
| CH₃ | H | CH(CH₃)₂ | H | 0 | 4 | 9 | 8 | 9 | 6 | 9 | 6 | 9 |
| CH₃ | H | CH(CH₃)₂ | H | 2 | 7 | 8 | 9 | 9 | 0 | 5 | 7 | 9 |
| CH₃ | H | ▷ | H | 0 | 7 | 9 | 9 | 9 | 7 | 9 | 6 | 9 |
| CH₃ | CH₃ | Same as above | H | 0 | 3 | 8 | 8 | 9 | 8 | 9 | 9 | 9 |
| CH₃ | H | ...do... | H | 1 | 7 | 9 | 9 | 9 | 7 | 9 | 9 | 9 |
| CH₃ | H | ...do... | H | 2 | 8 | 8 | 9 | 9 | 9 | 9 | 7 | 9 |
| CH₃ | CH₃ | ...do... | H | 2 | 7 | 8 | 9 | 9 | 7 | 9 | 9 | 9 |
| CH₃ | H | ▷-CN | H | 0 | 1 | 7 | 6 | 9 | 4 | 7 | 1 | 7 |
| CH₃ | H | ▷-CH₃ | H | 0 | 2 | 8 | 6 | 8 | 8 | 9 | 3 | 9 |
| CH₃ | H | Same as above | H | 2 | 6 | 8 | 8 | 9 | 6 | 8 | 1 | 9 |
| C₂H₅ | H | ▷ | H | 0 | 4 | 8 | 8 | 9 | 8 | 9 | 6 | 9 |
| C₂H₅ | H | Same as above | H | 2 | 8 | 8 | 8 | 9 | 9 | 9 | 9 | 9 |
| CH(CH₃)₂ | H | ...do... | H | 0 | 5 | 7 | 8 | 8 | 9 | 9 | 9 | 9 |
| CH(CH₃)₂ | H | ...do... | H | 2 | 8 | 8 | 8 | 9 | 9 | 9 | 9 | 9 |
| CH₃ | H | C(CH₃)₃ | H | 0 | 8 | 9 | 7 | 9 | 7 | 9 | 9 | 9 |
| CH₃ | H | C(CH₃)₃ | H | 2 | 0 | 6 | 7 | 8 | 0 | 0 | 4 | 9 |
| CH₃ | H | ◇ | H | 0 | 5 | 7 | 7 | 9 | 8 | 9 | 9 | 9 |
| CH₃ | H | Same as above | H | 2 | 5 | 8 | 8 | 9 | 0 | 0 | 2 | 9 |
| CH₃ | H | —CHC₃H₇ (CH₃) | H | 0 | 6 | 7 | 8 | 8 | 6 | 9 | 9 | 9 |
| C₂H₅ | H | Same as above | H | 0 | 2 | 6 | 7 | 8 | 8 | 9 | 9 | 9 |
| CH(CH₃)₂ | H | ...do... | H | 0 | 0 | 0 | 5 | 6 | 7 | 8 | 6 | 9 |
| CH₃ | H | ...do... | H | 2 | 8 | 8 | 9 | 9 | 9 | 9 | 9 | 9 |
| C₂H₅ | H | ...do... | H | 2 | 7 | 8 | 9 | 9 | 9 | 9 | 7 | 9 |
| CH(CH₃)₂ | H | ...do... | H | 2 | 2 | 8 | 8 | 9 | 6 | 6 | 5 | 9 |
| CH₃ | CH₃ | ▷ | CH₃ | 0 | 0 | 3 | 8 | 8 | 2 | 8 | 8 | 9 |
| CH₃ | CH₃ | Same as above | CH₃ | 2 | 3 | 7 | 9 | 9 | 2 | 6 | 4 | 9 |
| (CH₃)₂N | H | C₂H₅ | H | 2 | 8 | 8 | 9 | 9 | 3 | 5 | 9 | 9 |
| (CH₃)₂N | CH₃ | C₂H₅ | H | 2 | 8 | 8 | 9 | 9 | 0 | 7 | 0 | 9 |
| CH₃NH | CH₃ | C₂H₅ | H | 2 | 6 | 8 | 8 | 9 | 3 | 6 | 6 | 9 |
| C₂H₅ | CH₃ | ▷ | H | 2 | 7 | 8 | 8 | 9 | 7 | 9 | 4 | 9 |
| C₂H₅ | CH₃ | C₂H₅ | H | 0 | 6 | 8 | 9 | 9 | 8 | 9 | 9 | 9 |

F. 97

We claim as our invention:

1. A herbicidal formulation comprising a herbicidally effective amount of a compound of the formula

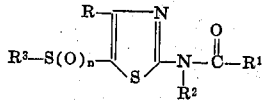

wherein R represents hydrogen or alkyl of up to four carbon atoms, R¹ is alkyl of two to eight carbon atoms, cyclic alkyl of three to eight carbon atoms optionally substituted by phenyl or cyano, or alkenyl of two to eight carbon atoms optionally containing up to two trifluoromethyl groups; n is 0, 1 or 2; R² is hydrogen or alkyl of up to four carbon atoms; R³ is alkyl of one to four carbon atoms or $$\begin{matrix} R^4 \\ -N \\ R^5 \end{matrix}$$

wherein R⁴ and R⁵ is each hydrogen or alkyl of one to four carbon atoms, together with an adjuvant therefor.

2. A method of controlling weeds, which comprises applying to the habitat a herbicidally effective amount of a compound of the formula

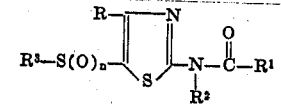

wherein R represents hydrogen or alkyl of up to four carbon atoms, $R^1$ is alkyl of two to eight carbon atoms, cyclic alkyl of three to eight carbon atoms optionally substituted by phenyl or cyano, or alkenyl of two to eight carbon atoms optionally containing up to two trifluoromethyl groups; $n$ is 0, 1 or 2; $R^2$ is hydrogen or alkyl of up to four carbon atoms, $R^3$ is alkyl of one to four carbon atoms or

wherein $R^4$ and $R^5$ is each hydrogen or alkyl of one to four carbon atoms.

3. A herbicidal composition according to claim 1 wherein R represents hydrogen or methyl, $R^1$ is alkyl of two to five carbon atoms or cyclic alkyl of up to four carbon atoms, $R^2$ is hydrogen or methyl, $R^3$ is alkyl of up to three carbon atoms or

wherein $R^4$ and $R^5$ represent hydrogen or alkyl of up to three carbon atoms, $n$ is 0, 1 or 2.

4. A herbicidal composition according to claim 3 wherein R represents hydrogen or methyl; $R^1$ is ethyl, isopropyl, cyclopropyl or 1-methylbutyl; $R^2$ is hydrogen; $R^3$ is methyl, ethyl, isopropyl or dimethylamino; $n$ is 0 or 2.

5. A method of controlling weeds according to claim 2 wherein R represents hydrogen or methyl, $R^1$ is alkyl of two to five carbon atoms or cyclic alkyl of up to four carbon atoms, $R^2$ is hydrogen or methyl, $R^3$ is alkyl of up to three carbon atoms or

wherein $R^4$ and $R^5$ represent hydrogen or alkyl of up to three carbon atoms, $n$ is 0, 1 or 2.

6. A method of controlling weeds according to claim 5 wherein R represents hydrogen or methyl; $R^1$ is ethyl, isopropyl, cyclopropyl or 1-methylbutyl; $R^2$ is hydrogen; $R^3$ is methyl, ethyl, isopropyl or dimethylamino; $n$ is 0 or 2.

* * * * *